United States Patent Office 3,226,387
Patented Dec. 28, 1965

3,226,387
4-HYDROXY-QUINAZOLINE-3-OXIDES
Geoffrey Tattersall Newbold, Saffron Walden, and Helen Pauline Tippett, Cambridge, England, assignors to Fisons Pest Control Limited, Harston, Cambridgeshire, England, a British company
No Drawing. Filed Nov. 21, 1961, Ser. No. 154,043
Claims priority, application Great Britain, Dec. 1, 1960, 41,248/60; Jan. 14, 1961, 1,646/61
23 Claims. (Cl. 260—251)

The present invention relates to improved fungicidal compositions and to new heterocyclic oxides having fungicidal properties.

It has been found that the heterocyclic oxides as hereinafter defined possess high activity as fungicides.

Accordingly the present invention is for a fungicidal composition which contains a heterocyclic oxide of the following formula I.

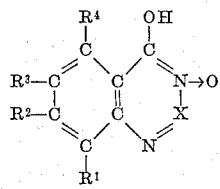

Formula I or a salt or a functional derivative thereof; wherein in the above formula $R^1$, $R^2$, $R^3$ and $R^4$ may be the same or different, and are selected from the group comprising hydrogen, alkyl (for example of 1–8 carbon atoms such as methyl or amyl), substituted alkyl (for example chloromethyl or nitroethyl), halogen (for example chlorine, bromine or iodine), nitro, hydroxyl, acyloxy (for example acetyloxy, propionyloxy or butyryloxy), alkoxy (for example methoxy, ethoxy, butoxy or hexyloxy), amino, alkylamino (for example methylamino, butylamino or octylamino), dialkylamino (for example dimethylamino, methylbutylamino, ethyloctylamino or dibutylamino), acylamino (for example acetylamino or propionylamino), carboxy, carbalkoxy (for example carbomethoxy or carbethoxy), thiol and alkylthiol (for example ethylthiol or butylthiol) radicals; and wherein X is the group N or $CR^5$, where $R^5$ is selected from the group comprising hydrogen, alkyl (for example of 1–8 carbon atoms such as methyl or amyl), cycloalkyl (for example cyclopentyl or cyclohexyl), aralkyl (for example ethylphenyl, benzyl or xylyl), or aryl (for example phenyl or naphthyl) radicals, substituted or unsubstituted, or an alkyl chain, for example of 2–10 carbon atoms, interrupted by one or more of the groups —CO—, —O—, —S— or —NZ—, where Z is hydrogen or an alkyl radical for example of 1–8 carbon atoms such as methyl or ethyl, provided that where $R^1$, $R^2$, $R^3$ and $R^4$ are all hydrogen, $R^5$ is selected from the group comprising alkyl groups of at least 2 carbon atoms, cycloalkyl or aralkyl radical, substitute or unsubstituted, or an alkyl chain, for example of 2–10 carbon atoms, interrupted by one or more of the groups —CO—, —O—, —S— or —NZ—, where Z is hydrogen or an alkyl radical.

The heterocyclic oxides exist in tautomeric form as follows:

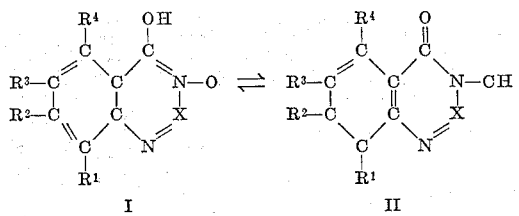

but for convenience are shown and referred to herein as oxides of formula I. It is to be understood that the reference to these oxides cover both tautomeric forms, The fungicidal compositions according to the present invention may also contain one or more of the materials selected from the group comprising surface active agents and solid diluents.

The present invention is also for a process for the treatment of plants, areas and articles which comprises treating the plants, areas and articles with a fungicidal composition containing as active ingredient a heterocyclic oxide as identified above, or a salt or functional derivative thereof.

The present invention is also for new compounds of the formula:

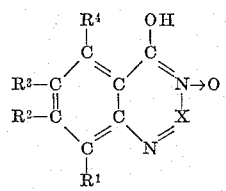

or a salt or functional derivative thereof; wherein $R^1$, $R^2$, $R^3$, $R^4$ and X have the significance indicated above. The functional derivatives which are particularly preferred are esters for example with aliphatic acids such as acetic acid, propionic acid, butyric acid and the like. Some of the resulting esters are capable of forming acid addition salts such as the hydrochloride, and such acid addition salts are included in the scope of the present invention.

According to one preferred embodiment, the invention is for the new heterocyclic oxides of the formula:

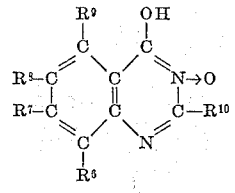

and salts and esters with aliphatic acids thereof, wherein $R^6$, $R^7$, $R^8$ and $R^9$ are the same or different and are selected from the group comprising hydrogen, alkyl (for example of 1–8 carbon atoms), alkoxy (for example of 1–8 carbon atoms), halogen (for example chlorine or iodine) and nitro groups, and $R^{10}$ is hydrogen or an alkyl group (for example of 1–8 carbon atoms) provided that where $R^6$, $R^7$, $R^8$ and $R^9$ are all hydrogen $R^{10}$ is an alkyl group of at least 2 carbon atoms (for example of 2–8 carbon atoms); and for the use of these new compounds as fungicides.

A further preferred embodiment of the invention is for the new heterocyclic oxides of the formula:

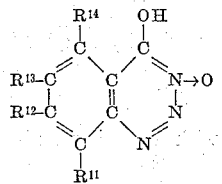

and salts and esters with aliphatic acids thereof, wherein $R^{11}$, $R^{12}$, $R^{13}$ and $R^{14}$ are the same or different and are selected from the group comprising hydrogen, alkyl (for example of 1–8 carbon atoms), alkoxy (for example of 1–8 carbon atoms), halogen (for example chlorine or iodine) and nitro groups; and the use of these new compounds as fungicides.

New heterocyclic oxides according to the present invention which may be mentioned include:
2-ethyl-4-hydroxy-quinazoline-3-oxide 2-n-propyl-4-hydroxyquinazoline-3-oxide
6-chloro-2-methyl-4-hydroxyquinazoline-3-oxide
6-chloro-2-ethyl-4-hydroquinazoline-3-oxide
6-chloro-2-n-propyl-4-hydroxyquinazoline-3-oxide
6,8-dichloro-2-methyl-4-hydroxy-quinazoline-3-oxide
6,8-dichloro-2-ethyl-4-hydroxyquinazoline-3-oxide
4-hydroxy-6-nitrobenzo-1,2,3-triazine-3-oxide
6,8-dichloro-4-hydroxybenzo-1,2,3-triazine-3-oxide
5-chloro-4-hydroxy-2-methyl-quinazoline-3-oxide
4-hydroxy-2-pentyl-7-nitro-quinazoline-3-oxide
4-hydroxy-2,8-dimethyl-quinazoline-3-oxide
4-hydroxy-6-methoxy-2-methyl-quinazoline-3-oxide
6,8-dichloro-4-hydroxy-quinazoline-3-oxide
4-hydroxy-6-nitro-quinazoline-3-oxide
3-acetoxy-2-methyl-6-nitro-3,4-dihydroquinazol-4-one
4-hydroxy-2-methyl-6-nitro-quinazoline-3-oxide
6-chloro-2-methyl-3-propionyloxy-3,4-dihydroquinazol-4-one
3-propionyloxy-6-nitro-3,4-dihydroquinazol-4-one
3-acetoxy-2-methyl-7-nitro-3,4-dihydroquinazol-4-one
4-hydroxy-2-methyl-7-nitro-quinazoline-3-oxide
2-ethyl-4-hydroxy-7-nitro-quinazoline-3-oxide
2-methyl-7-nitro-3-propionyloxy-3,4-dihydroquinazol-4-one
3-acetoxy-2-ethyl-7-nitro-3,4-dihydroquinazol-4-one.

Salts of the heterocyclic oxides according to the present invention which may be mentioned include alkali metal, for example sodium and potassium, ammonium, amine and metal, for example calcium and copper salts.

According to a preferred embodiment the invention is for compounds and fungicidal compositions containing compounds of Formula I wherein X is the group $CR^5$. Such compounds are hydroxyquinazoline-3-oxides.

In accordance with one embodiment of the invention the new hydroxyquinazoline-3-oxides are prepared by reacting an anthranilic acid of the formula:

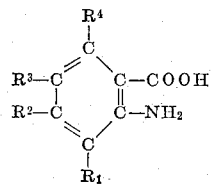

with an acid anhydride of the general formula:

$$R^5\text{—CO—O—CO—}R^5$$

to give the benzoxazone of the formula:

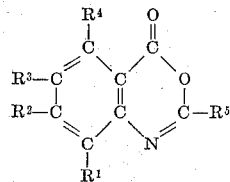

and condensing this with hydroxylamine to give the hydroxyquinazoline-3-oxide, wherein in the above formulae $R^1$, $R^2$, $R^3$, $R^4$ and $R^5$ have the significance indicated above.

In accordance with a further embodiment of the invention the new hydroxyquinazoline-3-oxides are prepared by reacting the anthranilic acid derivative of the formula:

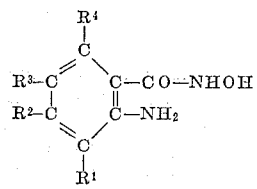

with a substantial excess, for example 12 equivalents, of the acid anhydride of the formula:

$$R^5\text{—CO—O—CO—}R^5$$

at elevated temperatures, for example 140° C. to give the hydroxyquinazoline-3-oxide, wherein in the above formulae $R^1$, $R^2$, $R^3$, $R^4$ and $R^5$ have the significance indicated above. The hydroxy quinazoline-3-oxide may be obtained from its acyl derivative by hydrolysis with sodium carbonate. When $R^5$ is hydrogen, the use of formic acid in place of the anhydride gives the direct formation of the quinazoline.

In accordance with a further embodiment of the invention the new hydroxyquinazoline-3-oxides are prepared by reacting the anthranilic acid derivative of the formula:

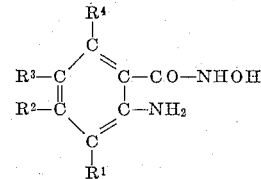

with a small excess, for example 4 equivalents, of the acid anhydride of the formula:

$$R^5\text{—CO—O—CO—}R^5$$

to give the corresponding N-acyl o-amino benzhydroxamic acid, which in some cases is so unstable that it cyclises spontaneously, and in other cases requires cyclisation by heat or acid treatment, to the hydroxyquinazoline-3-oxide, wherein in the above formulae $R^1$, $R^2$, $R^3$, $R^4$ and $R^5$ have the significance indicated above.

In accordance with a yet further embodiment of the invention the new hydroxyquinazoline-3-oxides are prepared by reacting the N-acyl derivative of the anthranilic acid derivative ester of the formula:

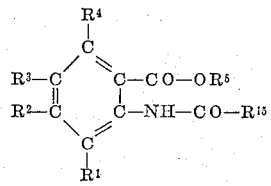

wherein $R^1$, $R^2$, $R^3$, $R^4$ and $R^5$ have the significance indicated above and $R^{15}$ in a monovalent organic radical, such as an alkyl, aryl or aralkyl radical, with hydroxylamine suitably at room temperature, whereupon the presumed intermediate acylamino hydroxyamic acid loses water under the conditions of reaction to give the corresponding hydroxyquinazoline-3-oxide.

The present invention is also for the new compounds formed as intermediates in the synthesis of the new hydroxyquinazoline-3-oxides and in particular for the benzoxazones of the formula:

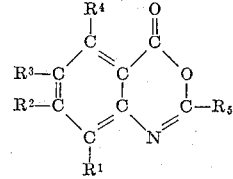

wherein $R^1$, $R^2$, $R^3$, $R^4$ and $R^5$ have the significance indicated above excepting the compound where $R^5$ is methyl, $R^3$ is chlorine and $R^1$, $R^2$ and $R^4$ are hydrogen.

In accordance with a further embodiment of the invention the invention is for compounds and fungicidal compositions containing compounds of Formula I wherein X is nitrogen. Such compounds are hydroxybenzotriazine-3-oxides.

In accordance with another embodiment of the invention the new hydroxybenzotriazine-3-oxides are prepared by reacting an ester of an anthranilic acid of the formula:

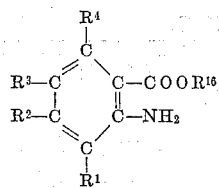

where $R^{16}$ is a simple alkyl radical such as for example methyl or ethyl, with hydroxylamine to give the corresponding benzohydroxamic acid of the formula:

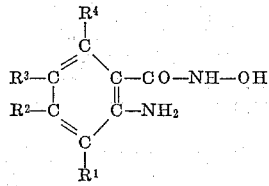

and cyclising this for example with sodium nitrite in sulphuric acid to give the hydroxybenzotriazine-3-oxide, wherein in the above formulae $R^1$, $R^2$, $R^3$ have the significance indicated above.

The present invention is also for the new compounds formed as intermediates in the synthesis of the new hydroxybenzotriazine-3-oxides and in particular for the benzohydroxamic acids of the formula:

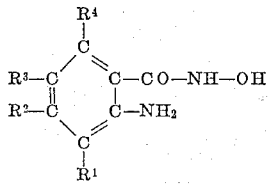

wherein $R^1$, $R^2$, $R^3$ and $R^4$ have the significance indicated above.

The heterocyclic oxides according to the present invention are active against a wide range of fungal organisms including *Phytophthora palmivora, Alternaria solani, Botrytis fabae, Fusarium oxysporum, Helminthosporum gramineum, Sclerotinia trifoliorium, Septoria apiigraveolentis* and *Fomes annosus*.

The activity of the various heterocyclic oxides varies both qualitatively and quantitatively, some compounds possessing a general greater activity than other and some compounds possessing a greater specific activity against certain organisms than the other compounds. Thus for example 6-chloro-2-methyl-4-hydroxy-quinazoline - 3-oxide possesses a high activity against *Phytophthora palmivora, Fusarium oxysporum* and *Helminthosporum gramineum*.

The analogous compounds, 4-hydroxyquinazoline - 3-oxide, 2-methyl-4-hydroxyquinazoline-3-oxide and 2-phenyl - 4 - hydroxyquinazoline-3-oxide, have no useful fungicidal activity and are not covered in the present application.

Certain of the heterocyclic oxides according to the present invention are substantially insoluble in water and may be incorporated in fungicidal compositions in any of the ways commonly adapted for the formulation of insoluble fungicides. Thus for example the heterocyclic oxides may be incorporated into an aqueous suspension with or without wetting agents or into an emulsion and/or mixed with solid inert diluents.

Many salts and other functional derivatives of the heterocyclic oxides according to the present invention are water soluble, and a suitable fungicidal composition comprises a solution of the water soluble heterocyclic oxide or salt or derivative thereof in water.

Alternatively the fungicidal composition may be formed by dissolving the heterocyclic oxide in a water immiscible solvent such as for example a high boiling aromatic hydrocarbon containing dissolved emulsifying agents so as to act as a self-emulsifiable oil on addition to water.

Similarly the fungicidal composition may be formed by dissolving the heterocyclic oxide in an organic solvent, such as for example methyl Cellosolve or ethanol, and the resulting solution used as such or dispersed in water with or without the assistance of a wetting agent. Alternatively the heterocyclic oxide may be admixed with a wetting agent or a non-solvent diluent to be used as such or to form a product which is dispersible in water. The heterocyclic oxide may also be mixed with a wetting agent, with or without the incorporation of powdered or divided solid materials as referred to above, so that a wettable product is obtained which is capable of use as such or as a suspension or dispersion in water.

The heterocyclic oxide may be incorporated for example with solid inert media comprsing powdered or divided solid materials, for example clays, sands, talc, mica, fertilizers and the like, such products either comprising dust or larger particle size materials.

The heterocyclic oxide may be incorporated for example with solid inert media comprising powdered or divided solid materials, as referred to above, together with a wetting agent, so that a wettable product is obtained which is capable of use as such or as a suspension or dispersion in water.

The wetting agents used may comprise anionic compounds such as for example soaps, fatty sulphate esters such as dodecyl sodium sulphate, fatty aromatic sulphonates such as alkylbenzene-sulphonates or butyl naphthalene sulphates, more complex fatty sulphonates such as the amide condensation product or oleic acid and N-methyl taurine or sodium sulphonate of dioctyl succinic acid. The wetting agents may also comprise non-ionic agents such as for example condensation products of fatty acids, fatty alcohols or fatty substituted phenols with ethylene oxide, or fatty esters and ethers of sugar or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

If desired the fungicidal compositions according to the present invention may contain in addition to the heterocyclic oxide other agricultural chemicals such as herbicides, fungicides, pesticides, plant growth regulants and the like. According to one embodiment of the invention the heterocyclic oxide is mixed with other fungicides such as for example sulphur, copper compounds such as cuprous oxide, copper hydroxide or copper oxychloride, nickel compounds such as nickel hydroxide or organic fungicides such as tetramethylthiuram disulphide, and divalent metal salts, for example zinc and manganese salts of ethylene-bis-dithiocarbamic acid.

The following examples are given to illustrate the present invention. The parts and percentages quoted are by weight unless otherwise indicated.

*Example 1*

To 5 equivalents of propionic anhydride at 80° C. was added 1 equivalent of 2-amino-5-chlorobenzoic acid. The reaction mixture was maintained at 120° C. for two hours and the volume then reduced to about half by distillation under reduced pressure. The residue was crystallized and recrystallized from petroleum ether (boiling range 60–80° C.) or carbon tetrachloride. The product 6-chloro-2-ethyl-3,1,4H-benzoxaz-4-one was recovered in a yield of 62%, melting point 79–81° C.

*Example 2*

The process of Example 1 was repeated replacing propionic anhydride by n-butyric anhydride. The product 6-chloro-2-n-propyl-3,1,4H-benzoxaz-4-one was recovered in a yield of 80%, melting point 66–67° C.

Example 3

The process of Example 1 was repeated replacing propionic anhydride by n-propionic anhydride and 2-amino-5-chlorobenzoic acid by 2-amino-3,5-dichlorobenzoic acid. The product 6,8-dichloro-2-ethyl-3,1,4H-benzoxaz-4-one was recovered in a yield of 83.5%, melting point 102–104° C.

Example 4

To about 30 parts of 2-ethyl-3,1,4H-benzoxaz-4-one dissolved in 500 parts of methyl alcohol was added, at room temperature, a volume containing 2½ equivalents of hydroxylamine obtained by adding at 0° C. solutions of 32 parts of sodium hydroxide and 27.8 parts of hydroxylamine hydrochloride in water and making up to 200 parts with water. After standing for seven days at room temperature the solution was evaporated to dryness under reduced pressure, the residue dissolved in water and the crude product precipitated with hydrochloric acid. The product was filtered, washed with water, dried and recrystallized from petroleum ether (boiling range 60–80° C.) and benzene or from carbon tetrachloride.

The product 2-ethyl-4-hydroxy-quinazoline-3-oxide was recovered in a yield of 24%, melting point 145–146° C.

Found: C, 62.85; H, 5.65; N, 14.77%. Calculated for $C_{10}H_{10}N_2O_2$: C, 63.15; H, 5.30; N, 14.73%.

Example 5

The process of Example 4 was repeated replacing 2-ethyl-3,1,4H-benzoxaz-4-one by 2-propyl-3,1,4H-benzoxaz-4-one. The product 2-propyl-4-hydroxy-quinazoline-3-oxide was recovered in a yield of 23%, melting point 151–152° C.

Found: C, 64.61; H, 6.31; N, 13.42%. Calculated for $C_{11}H_{12}N_2O_2$: C, 64.69; H, 5.92; N, 13.72%.

Example 6

To about 25 parts of 6-chloro-2-methyl-3,1,4H-benzoxaz-4-one dissolved in 250 parts of methyl alcohol and 250 parts of dioxan was added at room temperature a volume containing 2½ equivalents of a solution of hydroxylamine, prepared as indicated in Example 4. After standing for seven days at room temperature the reaction mixture was evaporated to dryness and the residue dissolved in water. The crude product was precipitated with hydrochloric acid, filtered off, washed with water, dried and crystallized from ethyl alcohol.

The product 6-chloro-2-methyl-4-hydroxy-quinazoline-3-oxide was recovered in a yield of 60%, melting point 229–230° C.

Found: C, 51.42; H, 3.55; N, 13.28; Cl, 16.64%. Calculated for $C_9H_7N_2O_2Cl$: C, 51.33; H, 3.35; N, 13.31; Cl, 16.84%.

Example 7

The process of Example 6 was repeated replacing 6-chloro-2-methyl-3,1,4H-benzoxaz-4-one by 6-chloro-2-ethyl-3,1,4H-benzoxaz-4-one. The product 6-chloro-2-ethyl-4-hydroxy-quinazoline-3-oxide was recrystallized from carbon tetrachloride, then sublimed at 150–190° C. under a pressure of 20 millimeters of mercury and finally recrystallized from methyl acetate. The product was recovered in a yield of 23%, melting point 183–185° C.

Found: 53.00; H, 4.22; N, 11.62%. Calculated for $C_{10}H_9N_2O_2Cl$: C, 53.46; H, 4.04; N, 12.47%.

Example 8

The process of Example 6 was repeated replacing 6-chloro-2-methyl-3,1,4H-benzoxaz-4-one by 6-chloro-2-n-propyl-3,1,4H-benzoxaz-4-one. The product 6-chloro-2-n-propyl-4-hydroxy-quinazoline-3-oxide was sublimed at 200–250° C. under a pressure of 0.07 millimeters of mercury. The product was recovered in a yield of 11%, melting point 144° C.

Found: C, 55.12; H, 4.84; N, 12.07; Cl, 14.45%. Calculated for $C_{11}H_{11}N_2O_2Cl$: C, 55.35; H, 4.65; N, 11.74; Cl, 14.85%.

Example 9

To about 20 parts of 6,8-dichloro-2-methyl-3,1,4H-benzoxaz-4-one dissolved in 250 parts of methyl alcohol and 250 parts of dioxan was added, at room temperature, a volume containing 2½ equivalents of a solution of hydroxylamine, prepared as indicated in Example 4. After standing at room temperature for seven days the reaction mixture was evaporated to dryness and the residue dissolved in water. The crude product was precipitated with hydrochloric acid, filtered off, washed with water and dried.

The dried product was recrystallized from acetic acid. The product 6,8-dichloro-2-methyl-4-hydroxy-quinazoline-3-oxide, melting point 263° C. was obtained in a yield of 24%.

Found: C, 44.12; H, 2.85; N, 11.54; Cl, 28.55%. Calculated for $C_9H_6N_2Cl_2O_2$: C, 44.10; H, 2.47; N, 11.43; Cl, 28.92%.

The product was dissolved by warming in an equivalent amount of normal aqueous sodium hydroxide, and the solution deposited the solid sodium salt on cooling.

Example 10

The process of Example 9 was repeated replacing 6,8-dichloro-2-methyl-3,1,4H-benzoxaz-4-one by 6,8-dichloro-2-ethyl-3,1,4H-benzoxaz-4-one. The dried product containing 6,8-dichloro-2-ethyl-4-hydroxy-quinazoline-3-oxide was extracted with benzene giving a soluble portion alpha, and insoluble portion beta. Each portion was recrystallized from acetic acid.

The melting point of the alpha form was 208–210° C., yield 17%. The melting point of the beta form was 183–183.5° C., yield 19%.

Found alpha form: C, 46.20; H, 3.35; N, 10.95; Cl, 26.72%. Found: beta form: C, 46.35; H, 3.50; N, 9.15; Cl, 26.60%. Calculated for $C_{10}H_8N_2O_2Cl_2$: C, 46.35; H, 3.11; N, 10.81; Cl, 27.37%.

Example 11

The hydroxy-quinazoline-3-oxide indentified in column 1 of the table below was incorporated in the nutrient medium known as potato-dextrose-agar medium at the rates of 10 parts per million (10 p.p.m.), 50 parts per million (50 p.p.m.) and 100 parts per million (100 p.p.m.) and the cooled culture plates inoculated with mycelial plugs of parasitic fungi.

The parasitic fungi are as follows:

A—*Phytophthora palmivora*
B—*Alternaria solani*
C—*Botrytis fabae*
D—*Fusarium oxysporum*
E—*Helminthosporum gramineum*
F—*Solerotinia trifoliorium*
G—*Septoria apii-graveolentis*
H—*Fomes annosus*

The results obtained are set out in the following table. The growth of fungi on the plates is scored as values from 3 to 0, where 3 represents complete suppression of the fungi and 0 represents no effect on the fungi. The reference letters in the table identify the fungi as set out above.

The results obtained with 2-methyl-4-hydroxyquinazoline-3-oxide are given in the following table solely for purposes of comparison.

| Compound | Rate, p.p.m. | Effect on fungi— | | | | | | | |
|---|---|---|---|---|---|---|---|---|---|
| | | A | B | C | D | E | F | G | H |
| 2-ethyl-4-hydroxy-quinazoline-3-oxide | 10 | 3 | 2 | 1 | 1 | 2 | 1 | 1 | 2 |
| | 50 | 3 | 3 | 2 | 3 | 3 | 2 | 2 | 3 |
| | 100 | 3 | 3 | 3 | 3 | 3 | 3 | 3 | 3 |
| 6-chloro-2-ethyl-4-hydroxy-quinazoline-3-oxide. | 10 | 3 | 2 | 2 | 2 | 3 | 2 | 1 | 2 |
| | 50 | 3 | 3 | 2 | 3 | 3 | 3 | 2 | 3 |
| | 100 | 3 | 3 | 3 | 3 | 3 | 3 | 3 | 3 |
| 6-chloro-2-methyl-4-hydroxy-quinazoline-3-oxide. | 10 | 3 | 1 | 2 | 3 | 3 | 2 | 1 | 2 |
| | 50 | 3 | 2 | 3 | 3 | 3 | 3 | 2 | 3 |
| | 100 | 3 | 3 | 3 | 3 | 3 | 3 | 3 | 3 |
| 6-chloro-2-n-propyl-4-hydroxy-quinazoline-3-oxide. | 10 | 2 | 1 | 2 | 1 | 2 | 1 | 2 | 3 |
| | 50 | 3 | 2 | 2 | 2 | 3 | 2 | 3 | 3 |
| | 100 | 3 | 3 | 3 | 3 | 3 | 3 | 3 | 3 |
| 6,8-dichloro-2-methyl-4-hydroxy-quinazoline-3-oxide. | 10 | 3 | 2 | 3 | 3 | 3 | 3 | 2 | 3 |
| | 50 | 3 | 3 | 3 | 3 | 3 | 3 | 3 | 3 |
| | 100 | 3 | 3 | 3 | 3 | 3 | 3 | 3 | 3 |
| 6,8-dichloro-2-ethyl-4-hydroxy-quinazoline-3-oxide. | 10 | 3 | 3 | 3 | 3 | 3 | 3 | 3 | 3 |
| | 50 | 3 | 3 | 3 | 3 | 3 | 3 | 3 | 3 |
| | 100 | 3 | 3 | 3 | 3 | 3 | 3 | 3 | 3 |
| 4-hydroxy-2,8-dimethyl-quinazoline-3-oxide. | 10 | 3 | 2 | 3 | 3 | 3 | 2 | 3 | 3 |
| | 50 | 3 | 3 | 3 | 3 | 3 | 3 | 3 | 3 |
| | 100 | 3 | 3 | 3 | 3 | 3 | 3 | 3 | 3 |
| 3-propionyloxy-6-nitro-3,4-dihydroquinazol-4-one. | 10 | 3 | 2 | 3 | 1 | 2 | 2 | 2 | 1 |
| | 50 | 3 | 3 | 3 | 2 | 2 | 2 | 3 | 2 |
| | 100 | 3 | 3 | 3 | 3 | 3 | 3 | 3 | 3 |
| 2-methyl-3-acetoxy-7-nitro-3,4-dihydro-quinazol-4-one. | 10 | 3 | 3 | 3 | 2 | 3 | 2 | 2 | 2 |
| | 50 | 3 | 3 | 3 | 2 | 3 | 2 | 3 | 3 |
| | 100 | 3 | 3 | 3 | 3 | 3 | 3 | 3 | 3 |
| 2-methyl-4-hydroxy-quinazoline-3-oxide | 10 | 2 | 0 | 0 | 0 | 1 | 1 | 0 | 0 |
| | 50 | 2 | 1 | 1 | 0 | 2 | 1 | 1 | 1 |
| | 100 | 3 | 2 | 2 | 1 | 3 | 2 | 1 | 2 |
| Control | | 0 | 0 | 0 | 0 | 0 | 0 | 0 | 0 |

Example 12

A solution of hydroxylamine was prepared by adding a cooled solution of 1 part sodium in 30 parts methanol which had been dried by standing over molecular sieve to a similarly cooled solution of 1.7 parts hydroxylamine hydrochloride in 25 parts methanol (dried similarly) and after allowing the solution to stand for 20 minutes, filtering off the sodium chloride. The hydroxylamine was added at room temperature with stirring to a solution of 3 parts ethyl 5-nitroanthranlate in 50 parts methanol and 30 parts dioxan. After 2 days at room temperature the solution was evaporated to dryness under reduced pressure, the solid dissolved in water and washed with ether. Acidification of the alkaline solution with hydrochloric acid precipitated the crude product, which was recrystallized from ethanol/water. The product 2-amino-5-nitrobenzohydroxamic acid was recovered in a yield of 40%, melting point 202° C.

Found: C, 43.15; H, 3.70; N, 20.80%. Calculated for $C_7H_7N_3O_4$: C, 42.64; H, 3.58; N, 21.31%.

Example 13

The process of Example 11 was repeated replacing the ethyl 5-nitroathranilate by 4.3 parts of 3,5-dichloroanthranilic acid. The product 2-amino-3,5-dichlorobenzohydroxamic acid was recovered in a yield of 50%, melting point 176–177° C. After recrystallisation from ethanol, the yield was reduced to 25%, melting point 190° C. 1.8 parts of the crude starting materials were recovered from the ethereal washings.

Example 14

One part of 2-amino-5-nitrobenzohydroxamic acid was dissolved with cooling in 12 parts of concentrated sulphuric acid. A solution of 0.4 parts sodium nitrite in 3 parts of sulphuric acid was added dropwise with stirring at 3–6° C. over 20 minutes. 35 parts of phosphoric acid (density 1.75) was then added at 0–10° C. over 25 minutes. The mixture was poured onto 100 parts of crushed ice and the precipitated product collected. The product 4-hydroxy-6-nitrobenzo-1,2,3-triazine-3-oxide was recovered in a yield of 47%, melting point 147° C. Recrystallization from water gave an analysis sample melting point 154° C.

Found: C, 40.40; H, 2.05; N, 27.00%. Calculated for $C_7H_4N_4O_4$: C, 40.39; H, 1.94; N, 26.92%.

Example 15

The process of Example 13 was repeated replacing 2-aminonitrobenzohydroxamic acid by 0.65 parts of 2-amino-3,5-dichlorobenzohydroxamic acid. The product 6,8-dichloro-4-hydroxybenzo-1,2,3-triazine-3-oxide was recrystallized from ethanol/water, and obtained in a 73% yield, melting point 184° C.

Found: C, 36.40; H, 1.45; Cl, 30.35%. Calculated for $C_7H_3N_3Cl_2O_2$: C, 36.23; H, 1.30; Cl, 30.56%.

Example 16

The hydroxy-benzotriazine-3-oxide identified in column 1 of the table below was incorporated in the nutrient medium known as potato-dextrose-agar medium at the rates of 10 parts per million ( 10 p.p.m.), 50 parts per million (50 p.p.m.) and 100 parts per million (100 p.p.m.) and the cooled culture plates inoculated with mycelial plugs of parasitic fungi. The parasitic fungi are as follows:

A—*Phytophtora palmivora*
B—*Alternaria solani*
C—*Botrytis fabae*
D—*Fusarium oxysporum*
E—*Helminthosporum gramineum*
F—*Sclerotinia trifoliorium*
G—*Septoria apii-graveolentis*
H—*Fomes annosus*

The results obtained are set out in the following table. The growth of fungi on the plates is scored as values from 3 to 0, where 3 represents complete suppression of the fungi and 0 represents no effect on the fungi. The reference letters in the table identify the fungi as set out above.

| Compound | Rate, p.p.m. | Effect on fungi— ||||||||
|---|---|---|---|---|---|---|---|---|---|
| | | A | B | C | D | E | F | G | H |
| 4-hydroxy-6-nitrobenzo-1,2,3-triazine-3-oxide. | 10<br>50<br>100 | 3<br>3<br>3 | 1<br>2<br>3 | 2<br>3<br>3 | 3<br>3<br>3 | 3<br>3<br>3 | 2<br>3<br>3 | 1<br>2<br>3 | 2<br>3<br>3 |
| 6,8-dichloro-4-hydroxybenzo-1,2,3-triazine-3-oxide. | 10<br>50<br>100 | 2<br>3<br>3 | 1<br>2<br>3 | 2<br>2<br>3 | 1<br>2<br>3 | 2<br>3<br>3 | 1<br>2<br>3 | 2<br>3<br>3 | 3<br>3<br>3 |

*Example 17*

A methanolic solution of hydroxylamine was prepared by adding a solution of 2 equivalents of hydroxylamine hydrochloride in methanol to a solution of 3 equivalents of sodium in methanol at 0–10° C. After 20 minutes the sodium chloride was filtered off. To this at less than 15° C. was added a solution in methanol and dioxan of one equivalent of N-acetyl-6-chloromethyl anthranilate. After the mixture had stood at room temperature for three days it was evaporated to dryness under reduced pressure, the residue dissolved in water, washed with ether and filtered. The product, 5-chloro-4-hydroxy-2-methyl quinazoline-3-oxide, was obtained on treating the alkaline solution with hydrochloric acid, and was recrystallised from ethanol. Melting point 180° C.; yield 58%.

Found: C, 50.40; H, 3.40; N, 13.35; Cl, 16.60%. Calculated for $C_9H_7ClN_2O_2$: C, 51.33; H, 3.35; N, 3.31; Cl, 16.84%.

*Example 18*

The process of Example 17 was repeated replacing N-acetyl-6-chloromethyl anthranilate by N-hexoyl-4-nitromethyl anthranilate. The product, 4-hydroxy-2-pentyl-7-nitroquinazoline-3-oxide was recrystallised from carbon tetrachloride/40–60° C. petrol. Melting point 132–133° C.; yield 70%.

Found: C, 56.10; H, 6.00; N, 14.70%. Calculated for $C_{13}H_{15}N_3O_4$: C, 56.31; H, 5.45; N, 15.16%.

*Example 19*

The process of Example 17 was repeated replacing N-acetyl-6-chloromethyl anthranilate by N-acetyl-3-methyl methyl anthranilate, and leaving the mixture to stand for 43 hours only. The product, 4-hydroxy-2,8-dimethyl quinazoline-3-oxide was recrystallized from ethanol. Melting point 194° C.; yield 64%.

Found: C, 62.91; H, 5.52; N, 14.96%. Calculated for $C_{10}H_{10}N_2O_2$: C, 63.15; H, 5.30; N, 14.73%.

*Example 20*

The process of Example 17 was repeated replacing N-acetyl-6-chloromethyl anthranilate by N-acetyl 5-methoxy methyl anthranilate, and leaving the mixture to stand for 26 hours only. The product, 4-hydroxy-6-methoxy-2-methyl quinazoline-3-oxide was recrystallized from aqueous acetic acid. Melting point 257° C.; yield 70%.

Found: C, 57.99; H, 5.52; N, 12.95%. Calculated for $C_{10}H_{10}N_2O_3$: C, 58.25; H, 4.89; N, 13.58%.

*Example 21*

2-amino-3,5-dichlorobenzohydroxamic acid was refluxed with an excess of formic acid (98.8%) for 10 minutes. The solution was poured onto water, the product, 6,8-dichloro-4-hydroxyquinazoline-3-oxide was filtered off and recrystallized from aqueous ethanol. Melting point 247–248° C.; yield 70%.

Found: C, 41.00; H, 1.85; N, 12.10; Cl, 30.55%. Calculated for $C_8H_4Cl_2N_2O_2$: C, 41.59; H, 1.74; N, 12.13; Cl, 30.69%.

*Example 22*

The process of Example 21 was repeated replacing 2-amino-3,5-dichlorobenzohydroxamic acid by 2-amino-5-nitrobenzohydroxamic acid. The product, 4-hydroxy-6-nitroquinazoline-3-oxide was recrystallized from aqueous acetic acid. Melting point 248–251° C.; yield 68%.

Found: C, 46.25; H, 2.70; N, 20.50%. Calculated for $C_8H_5N_3O_4$: C, 46.28; H, 2.43; N, 20.29%.

*Example 23*

2-amino-5-nitro-benzohydroxamic acid was refluxed with excess acetic anhydride for 30 minutes. The product was filtered off after cooling the solution. (A further portion may be obtained by pouring the mother liquors onto water.) The product was recrystallized from acetone and gave 3-acetoxy-2-methyl-6-nitro-3,4-dihydroquinazol-4-one. Melting point 228–230° C.; yield 67%.

Found: C, 50.15; H, 3.50; N, 16.10%. Calculated for $C_{11}H_9N_3O_5$: C, 50.19; H, 3.44; N, 15.96%.

The product was soluble in cold concentrated hydrochloric acid from which it can be recovered by neutralization. The product was also soluble in aqueous sodium hydroxide giving a red solution from which it can be recovered by neutralization.

*Example 24*

3-acetoxy-2-methyl-6-nitro-3,4-dihydroquinazol - 4-one was refluxed with excess aqueous sodium carbonate (10%) until a clear solution was obtained. The product was filtered off after acidification with hydrochloric acid. The product, 4-hydroxy-2-methyl-6-nitroquinazoline-3-oxide was recrystallized from aqueous acetic acid. Melting point 254–257° C.; yield 95%.

Found: C, 48.85; H, 3.30; N, 19.20%. Calculated for $C_9H_7N_3O_4$: C, 48.87; H, 3.19; N, 19.00%.

The product was ground with an equivalent amount of normal aqueous sodium hydroxide and thereby converted to the corresponding sodium salt.

*Example 25*

6-chloro-4-hydroxy-2-methylquinazoline - 3-oxide was warmed at 125–135° C. with an excess of 50% propionic acid/anhydride for 12 minutes. The solution was poured onto water, brought to pH 8 with sodium hydroxide and shaken for 2 hours. The product, 6-chloro-2-methyl-3-propionyloxy-3,4-dihydroquinazol-4-one was filtered off and recrystallized from ethanol. Melting point 123° C.; yield 96%.

Found: C, 53.85; H, 4.20; N, 10.70; Cl, 13.50%. Calculated for $C_{12}H_{11}ClN_2O_3$: C, 54.04; H, 4.16; N, 10.51; Cl, 13.29%.

*Example 26*

4-hydroxy-6-nitroquinazoline-3-oxide was warmed at 125–135° C. with an excess of 50% priopionic acid/anhydride. The product, 3-propionyloxy-6-nitro-3,4-dihydroquinazol-4-one was crystallized on cooling and was recrystallized from ethanol. Melting point 163–164° C.; yield 70%.

Found: C, 50.10; H, 3.84; N, 15.94%. Calculated for $C_{11}H_9N_3O_5$: C, 50.19; H, 3.45; N, 15.97%.

The product was soluble in strong aqueous hydrochloric acid, from which it can be recovered by neutralization.

*Example 27*

The process of Example 17 was repeated replacing N-acetyl-6-chloromethyl anthranilate by 4-nitromethyl anthranilate, and leaving the mixture to stand for 24 hours only. The product, 2-amino-4-nitrobenzohyroxamic acid was recrystallized from 50% aqueous acetic acid. Melting point 193.5 to 194° C.; yield 56%.

Found: C, 42.95; H, 4.00; N, 21.55%. Calculated for $C_7H_2N_3O_4$: C, 42.64; H, 3.58; N, 21.32%;

*Example 28*

The process of Example 23 was repeated replacing 2-amino-5-nitrobenzohydroxamic acid by 2-amino-4-nitrobenzoohydroxamic acid, giving 3-acetoxy-2-methyl-7-nitro-3,4-dihydroquinazol-4-one. Melting point 156–157° C.; yield 30%.

Found: C, 50.25; H, 3.80; N, 16.10%. Calculated for $C_{11}H_9N_3O_5$: C, 50.19; H, 3.44; N, 15.96%.

*Example 29*

The process of Example 17 was repeated replacing N-acetyl-6-chloromethyl anthranilate by N-acetyl-4-nitromethyl anthranilate. The product, 4-hydroxy-2-methyl-7-nitroquinazoline-3-oxide was recrystallized from ethanol. Melting point 242° C.; yield 60%.

Found: C, 48.60; H, 3.70; N, 18.90%. Calculated for $C_9H_7N_3O_4$: C, 48.85; H, 3.19; N, 19.00%.

*Example 30*

The process of Example 17 was repeated replacing N-acetyl-6-chloromethyl anthranilate by N-propionyl-4-nitromethyl anthranilate. The product, 2-ethyl-4-hydroxy-7-nitroquinazoline-3-oxide was recrystallized from aqueous ethanol. Melting point 191–192° C.; yield 53%.

Found: C, 50.85; H, 4.20; N, 18.15%. Calculated for $C_{10}H_9N_3O_4$: C, 51.06; H, 3.86; N, 17.87%.

*Example 31*

The process of Example 25 was repeated replacing 6-chloro-4-hydroxy-2-methyl quinazoline-3-oxide by 4-hydroxy-2-methyl-7-nitro-quinazoline-3-oxide. The product, 2-methyl-7-nitro-3-propionyloxy 3,4 - dihydroquinazol-4-one was recrystallized from carbon tetrachloride. Melting point 129° C.; yield 58%.

Found: C, 51.75; H, 4.30; N, 15.15%. Calculated for $C_{12}H_{11}N_3O_5$: C, 51.98; H, 4.00; N, 15.16%.

*Example 32*

The process of Example 23 was repeated replacing 2-amino-5-nitrobenzohydroxamic acid by 2-ethyl-4-hydroxy-7-nitroquinoline-3-oxide. The product, 3-acetoxy-2-ethyl-7-nitro-3,4-dihydroquinazol-4-one was recrystallized from carbon tetrachloride. Melting point 135° C.; yield 70%.

Found: C, 51.70; H, 4.30; N, 15.05%. Calculated for $C_{12}H_{11}N_3O_5$: C, 51.98; H, 4.00; N, 15.16%.

The anthranilic and N-acyl anthranilic esters used as starting materials in the foregoing examples were prepared from the anthranilic acids by the standard methods of acylation with 50% acid/anhydride mixture and esterification with diazomethane or methanolic hydrogen chloride. Where not previously known these were characterised by their analyses and infra-red spectra.

1. A member selected from the group consisting of heterocyclic oxides of the formula:

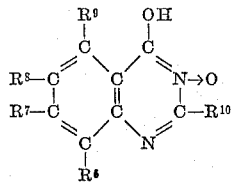

the sodium, potassium, ammonium, calcium and copper salts thereof, esters thereof with lower alkanoic acids and hydrochloride salt of the latter, wherein each of $R^6$, $R^7$, $R^8$ and $R^9$ is a member selected from the group consisting of H, alkyl of 1 to 8 carbon atoms, alkoxy of 1 to 8 carbon atoms, Cl, I and $NO_2$, and $R^{10}$ is a member selected from the group consisting of H and alkyl of 1 to 8 carbon atoms, and when $R^6$, $R^7$, $R^8$, $R^9$ and all H, $R^{10}$ is alkyl of 2 to 8 carbon atoms.

2. 6-chloro-2-methyl-4-hydroxy-quinazoline-3-oxide.
3. 6,8-dichloro-2-methyl - 4 - hydroxy-quinazoline-3-oxide.
4. 4-hydroxy-2,8-dimethyl-quinazoline-3-oxide.
5. 3-propionyloxy-6-nitro-3,4-dihydroquinazol-4-one.
6. 2-methyl-3-acetoxy - 7 - nitro-3,4-dihydroquinazol-4-one.
7. 2-ethyl-4-hydroxy-quinazoline-3-oxide.
8. 2-n-propyl-4-hydroxyquinazoline-3-oxide.
9. 6-chloro-2-ethyl-4-hydroxyquinazoline-3-oxide.
10. 6-chloro-2-n-propyl-4-hydroxyquinazoline-3-oxide.
11. 6,8-dichloro-2-ethyl-4-hydroxyquinazoline-3-oxide.
12. 5-chloro-4-hydroxy-2-methylquinazoline-3-oxide.
13. 4-hydroxy-2-pentyl-7-nitro-quinazoline-3-oxide.
14. 4-hydroxy-6-methoxy-2-methyl-quinazoline-3-oxide.
15. 6,8-dichloro-4-hydroxyquinazoline-3-oxide.
16. 4-hydroxy-6-nitro-quinazoline-3-oxide.
17. 3-acetoxy-2-methyl - 6 - nitro-3,4-dihydroquinazol-4-one.
18. 4-hydroxy-2-methyl-6-nitro-quinazoline-3-oxide.
19. 6-chloro-2-methyl - 3 - propionyloxy-3,4-dihydroquinazol-4-one.
20. 4-hydroxy-2-methyl-7-nitro-quinazoline-3-oxide.
21. 2-ethyl-4-hydroxy-7-nitro-quinazoline-3-oxide.
22. 2-methyl-7-nitro-3 - propionyloxy-3,4-dihydroquinazol-4-one.
23. 3-acetoxy-2-ethyl-7-nitro - 3,4 - dihydroquinazol-4-one.

References Cited by the Examiner

UNITED STATES PATENTS

| 2,489,353 | 11/1949 | Wolf et al. | 260—248 |
| 2,489,357 | 11/1949 | Wolf et al. | 260—248 |
| 2,786,055 | 3/1957 | Wallingford et al. | 260—251 |
| 2,915,521 | 12/1959 | Laubach et al. | 260—251 |
| 2,959,519 | 11/1960 | Speziale et al. | 167—33 |
| 2,976,207 | 3/1961 | Little et al. | 167—33 |
| 3,047,462 | 7/1962 | Maillard et al. | 260—256.4 |
| 3,073,826 | 1/1963 | Scarborough | 260—256.4 |

OTHER REFERENCES

Anschutz et al., Chem. Ber., vol. 35 (1902), pp. 3470, 3475 and 3480.

Anschutz et al., Chem. Ber. vol. 35, (1902), pp. 3480–5.

Boingdon, Chem. Abstracts, vol. 52 (1958), 12, 306e (Abstr. of Ann. Appl. Biol., vol. 46 (1958), pp. 47–54).

Harrison et al., J. Chem. Soc., London (1960), pp. 2157–60.

Jushi et al., J. Org. Chem., vol. 26 (1961), pp. 3714–17.

Legrand et al., Bull. Soc. Chim. Fr. (1961), pp. 618–23.

Newbold et al., J. Chem. Soc., London (1948), pp. 1864–6.

Sen et al., J. Indian Chem. Soc, vol. 25 (1948), pp. 437–8.

Taniyama et al., J. Pharm. Soc., Japan, vol. 81 (1961), pp. 431–6.

NICHOLAS S. RIZZO, *Primary Examiner.*

IRVING MARCUS, WALTER A. MODANCE,
*Examiners.*